United States Patent Office 3,399,661
Patented Sept. 3, 1968

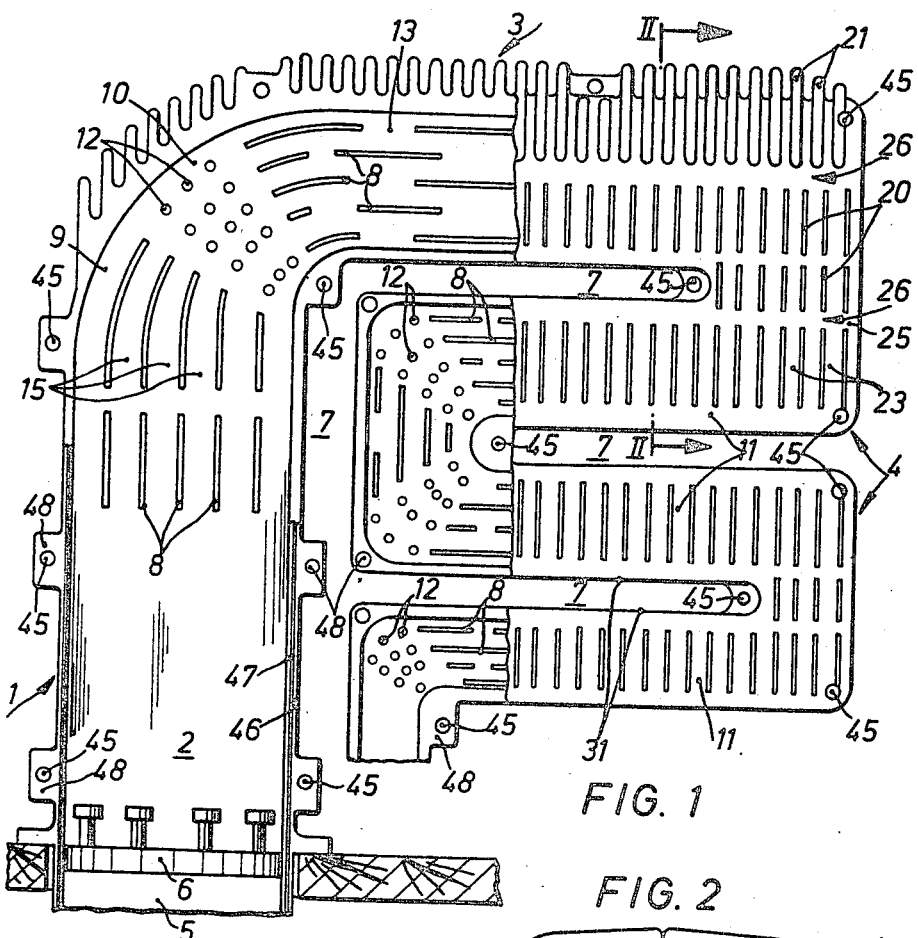
FIG. 1
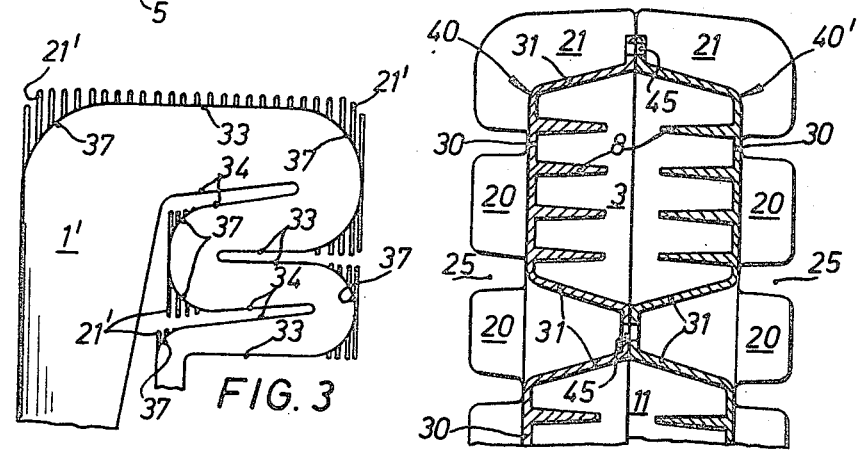
FIG. 3
FIG. 2

3,399,661
GAS OR LIQUID FUEL FIRED SPACE HEATER
Philipp Kreis, 34–36 Neumarkter Strasse,
Munich, Germany
Filed June 19, 1967, Ser. No. 647,163
7 Claims. (Cl. 126—118)

ABSTRACT OF THE DISCLOSURE

A compact space heater includes heat exchange coils for combustion products which follow a sinuous path having updraft and downdraft channels with internal interrupted ribs aligned with the path of combustion products flow and external interrupted vertical ribs.

The invention relates to a gas or liquid fuel fired space heater for heating small rooms, more particularly for heating trailers, motor vehicles, weekend houses or the like which comprises a vertical updraft channel having a burner therein for rising combustion gases and an adjacent vertical downdraft channel in which the combustion gases are deflected downwards. In the side walls of these channels outer and inner ribs are provided in the direction of the flow of the rising hot air and the combustion gases respectively and these ribs are interrupted by gaps to avoid a flow of heat within the ribs.

An optimum utilization of space and an increased heat emission can be achieved with a downdraft channel of several coils which is provided adjacent to the updraft channel which also is the combustion chamber. A complete deflection of the hot rising combustion gases downwards, especially through several coils, presents great difficulty. Such a deflection of the combustion gases without suction means, such as a ventilator is only possible when the construction of the heater takes into account the physical condition of the gases.

It is an object of the invention to improve the walls of the channels so that a compartively equally strong heat emission and a respective decrease in temperature in the combustion gas flow can be achieved for the gas flow along the entire channel. Because of the continuous drop in temperature towards the exit the combustion gases increase in specific gravity and velocity in the downdraft channel. If a respective drop in temperature can be guaranteed it is even possible in case of highest emission to guide the combustion gases downwards via the floor without suction.

It is another object of the invention to improve the channel walls of the heater so that in case of an optimum heat radiation to the atmosphere in the channel walls itself a flow of heat in the direction of the flowing medium and a respective heating of the following channel section is avoided as far as possible so that the wanted drop in temperature in the combustion gases is not affected by a renewed heating.

The invention accordingly provides projecting ribs at least on the interior of the channel walls in the direction of the flow of the combustion gases which are aligned to form ducts in the direction of the flow and these ribs are interrupted by small gaps.

A further improvement of the effect can be gained when, in addition, similar ribs are provided on the outside channel walls in the direction of the flow of the rising hot air.

The gaps between the ribs on the outer surface are aligned so that continuous cross gaps are caused. However, the gaps of the inner ribs are preferably displaced with respect to one another to avoid at least along the horizontal channel sections an unfavorable cross flow transverse to the direction of the gas flow. In both cases the gaps avoid a heat flow in the ribs.

A further improvement can be achieved when in the bend of the channel transverse pivot rods or similar means are provided instead of the ribs to prevent the heat flow also over shorter distances and also enable a compensation in flow.

In case of a further advantageous embodiment of the invention the cross section of the channel is reduced in accordance with cooling and the respective decrease in volume of the gases.

This can be done in case the side walls of the channel are parallel either by a stepwise or continuous reduction of the channel height or channel width.

Conveniently the heater with these ribbed channel walls can be made of two half shells connected in the longitudinal median plane by screws or rivets. These shells can easily be manufactured by casting or molding.

The invention will be described further, by way of example, with reference to the accompanying drawings which show two embodiments of the heater according to the invention, and in which:

FIG. 1 is a side elevation of a first embodiment, partly in section;

FIG. 2 is a section taken along line II—II of the two upper horizontal channels and FIG. 3 is a section through a further embodiment.

The heater according to the invention consists of an updraft channel 1, the lower part of which forms the combustion chamber 2, a deflecting channel 3 and a downdraft channel 4. A burner unit 6 is provided in the entry orifice 5 of the updraft channel. Fresh air can enter freely. The downdraft channel 4 is separated from the updraft channel 1 as well as the deflecting channel 3 and its coils by air spaces 7, which serve to provide heat insulation and prevent heat flow between these channel parts.

The updraft channel 1 has no projections on its inner surface in the area of the combustion chamber so that the flames can burn uninterruptedly. In the upper part of the updraft channel the ribs 8 are provided which extend in the direction of the flow and are of about the same length and in spaced relationship. At the bend 9 of the channel they are curved with the channel. In the bend 10 they are replaced with projections 12. In the straight section of the deflecting channel 3 as well as the horizontal channel sections 11 of the downdraft channel 4 the ribs 8 continue in a straight line. The ribs are comparatively short and interrupted with gaps 13. Their length is about 1–3 cm. and their thickness is 0.5–2 mm. As can be seen from the drawings the ribs are aligned in the direction of the flow, so that the ribs define continuous ducts 15. The gaps 13 are displaced with respect to one another in the horizontal parts of the channels.

As can be seen from the right side of FIG. 1 and FIG. 2 the outer surface of the heater also is provided with ribs 20 which are aligned in the direction of the flow of the hot air which is rising on the heater. The upper outer ribs are numbered 21 and project beyond the upper wall of the deflecting channel 3. The outer ribs 20 project along the two side walls of the entire heater surface plus the updraft channel where the outer ribs already are provided at the burner level or its vicinity. These outer ribs are also aligned and form flow ducts 23 which extend along the entire height of the heater. If the upper ribs 21, as is shown in FIG. 1, are strengthened because of design or other reasons they can be transposed compared with the aligned ribs 20 without affecting the flow of hot air. These outer ribs are not continuous either, but interrupted by gaps 25. In contradistinction to the inner ribs 8 these gaps 25 are aligned so that there are cross gaps 26. This arrangement of the outer gaps 25 makes manufacture much easier.

According to the embodiment of the FIGS. 1 and 2 the lateral vertical walls 30 as well as the horizontal walls 31 extend in parallel planes so that a reduction of the cross section of the channel can only be achieved with a decrease in channel height. In FIG. 1 the channel cross section along each of the channels sections 11 is unchanged but the cross section of each channel is smaller which means that there is a stepwise graduation. A continuous decrease in cross section can be seen from the embodiment according to FIG. 3, in which the top and bottom channel walls 33, 34 converge in direction of the flow.

Advantageously the walls 34 which are surrounded by a channel coil, are inclined while the other walls 33 remain in the horizontal position. The updraft channel 1' widens towards the top to create enough space for the continuously heated and expanding combustion gases and a smooth flow. To avoid dead-centers the deflection points are rounded off, as for example at 37 (FIG. 3). On the outer surface of these rounded parts extended vertical ribs 21' are provided to give the heater rectangular contours. To avoid confusion the inner ribs are not shown in FIG. 3.

Very advantageously the heater may be of shell construction, two similar casing shells 40, 40' (FIG. 2) which were molded or cast in one operation together with all the inner and outer ribs, are interconnected at holes 45 in flanges 48 (FIG. 1) by screws or rivets. On the connecting seam 46 of the shells a gas-tight connection is achieved with the ribs 47 and an embedded caulking rope and/or putty.

I claim:

1. A fluid-burning space heater, particularly suitable for trailers, motor vehicle cabs, weekend cabins and the like, having a combustion chamber which is completely closed against the atmosphere to be heated and into which the combustion air comes through the floor of a room from the outside, the combustion chamber comprising a vertical updraft channel (1) joined with a deflecting channel (3) and a downdraft channel (4) of coils which extends approximately downwards to the level of the burner (6) from where an outlet flue leads to the outside of the room, characterized in that the vertical side walls in the interior of the channels (1, 3, 4) are provided with ribs (8, 20, 21) which project normally from the channel walls and are aligned to form ducts (15) in the direction of the flow of gases and interrupted with gaps (13) in short intervals.

2. A heater as claimed in claim 1 wherein projections (12) are provided on the bends (10) of the channels instead of ribs.

3. A heater as claimed in claim 1 wherein in addition ribs (20, 21) are provided on the outer surfaces of the channel walls in the direction of the flow of the rising hot air which are also interrupted with gaps (25).

4. A heater as claimed in claim 1 wherein the gaps (13) of the inner ribs (8) are displaced with respect to one another at least along the horizontal sections of the channel.

5. A heater as claimed in claim 1 wherein the cross-section of the deflecting channel (3) and the following downdraft channel (4) and also the lateral inner ribs are convergent in the direction of the outlet in adjustment of the reducing volume of the combustion gases.

6. A heater as claimed in claim 1 wherein the updraft channel (1') widens in its cross-section towards the top.

7. A heater as claimed in claim 3 wherein it consists of two half shells (40, 40') connected in the longitudinal median plane of the heater with screws or rivets on their connecting seam.

References Cited

UNITED STATES PATENTS

| | | | |
|---|---|---|---|
| 1,546,592 | 7/1925 | Lawrence | 126—90 |
| 2,159,440 | 5/1939 | Livar | 126—118 X |
| 2,196,828 | 4/1940 | Hess | 126—91 X |

JAMES W. WESTHAVER, *Primary Examiner.*